United States Patent [19]
Onishi et al.

[11] 3,889,168
[45] June 10, 1975

[54] ON-OFF CONTROL CIRCUIT

[75] Inventors: Kazutoshi Onishi; Tsuneo Awano, both of Yokohama; Isao Masuzawa, Kuki, all of Japan

[73] Assignee: Kabushikikaisha Tokyo Keiki, Tokyo, Japan

[22] Filed: May 23, 1973

[21] Appl. No.: 363,172

[30] Foreign Application Priority Data
May 25, 1972 Japan.................................. 47-52064

[52] U.S. Cl. ............................................... 318/341
[51] Int. Cl. ............................................... H02p 5/16
[58] Field of Search .......... 318/252, 256, 257, 280, 318/296, 297, 523, 529, 341

[56] References Cited
UNITED STATES PATENTS

| | | | |
|---|---|---|---|
| 3,457,485 | 7/1969 | Leonard.......................... | 318/297 X |
| 3,596,162 | 7/1971 | Takayama.......................... | 318/341 |
| 3,812,410 | 5/1974 | Schaub et al. .................. | 318/341 X |

*Primary Examiner*—Robert K. Schaefer
*Assistant Examiner*—W. E. Duncanson, Jr.
*Attorney, Agent, or Firm*—Hill, Gross, Simpson, Van Santen, Steadman, Chiara & Simpson

[57] ABSTRACT

An ON-OFF control circuit for a load requiring large electric power having first and second transistors, and first and second resistors. The first transistor and first resistor form a first current path while the second transistor and the second resistor form a second current path. In this case, the second current path is connected at its one end to the base electrode of the first transistor and the base electrode of the second transistor is supplied with an ON-OFF control signal.

6 Claims, 3 Drawing Figures

ON-OFF CONTROL CIRCUIT

BACKGROUND OF THE INVENTION

Field of the Invention

The present invention relates to an ON-OFF control circuit for a load requiring large electrical power and more particularly to an ON-OFF control circuit for a load requiring large electrical power employing a transistor.

Description of the Prior Art

Generally, in an ON-OFF control circuit for a DC motor, the switching element must be designed so as to withstand the maximum current. Further, in the case when a motor is reversibly driven, during starting the maximum current flows through the circuit. Since the starting current can be suppressed by the total resistance of the circuit, the total resistance thereof is determined in accordance with the maximum current rating of the switching element. The above mentioned total resistance of the circuit is the sum of the internal resistance of the motor and resistances of a power source, connection wires, a current suppressing circuit and the like. The internal resistance of the motor is desired to be extremely small in order to minimize the temperature increase of the motor. In addition, the resistances of the power source and connection wires are also small, so that the maximum current is mainly determined by the resistance of the current suppressing circuit.

In view of the above aspect, there has been proposed an ON-OFF control circuit which consists of a series motor having an armature and field coils and two pairs of transistors which are each connected in a Darlington manner and inserted between the respective field coils and the negative electrode of the power source through a resistor. In this case, however, the each one of transistors forming a Darlington connection is quite large in power loss and hence in heat loss. As a result, the ON-OFF control circuit of this kind has a defect because the expence required for radiating away the heat is large.

Further, there has been proposed another ON-OFF control circuit in order to avoid the above described defect. In this case, one transistor is used in place of one pair of transistors of Darlington connection and a series circuit of a resistor and a switch is inserted between the base electrode of the transistor and the power source. With the above arrangement, the resistance of the series circuit is properly selected to satisfy the saturation condition of the transistors and hence to eliminate the above mentioned defect, but the current flowing through the resistor has caused a current loss.

SUMMARY OF THE INVENTION

An ON-OFF control circuit for a load requiring large electrical power according to this invention has provided therein a parallel divided flow path consisting of a series circuit including the emitter electrode of a first transistor, the collector electrode thereof and a first resistor and of another series circuit including the emitter electrode of the first transistor, the base electrode thereof, a second transistor and a second resistor, and the base electrode of the second transistor serves as an ON-OFF control input.

Further, the ON-OFF control circuit for a motor with two field windings according to this invention comprises four transistors, the first transistor being connected at its emitter electrode to a circuit corresponding to one rotational of the motor with two field windings, the second transistor being connected at its emitter electrode to a circuit corresponding to the other rotational direction thereof, the collector electrodes of the first and second transistors being interconnected and this connection point being connected to a first resistor, the third transistor being connected to the base electrode of the first transistor, the fourth transistor being connected to the base electrode of the second transistor, one of other electrodes of each of the third and fourth transistors being interconnected and this connection point being connected to a second resistor, the first and second resistors being interconnected at the other ends thereof, and the base inputs of the third and fourth transistors service as ON-OFF control inputs.

Accordingly, it is a principal object of this invention to provide a novel ON-OFF control circuit free from the above mentioned prior art defects.

It is another object of this invention to provide an ON-OFF control circuit for a load requiring large current in which a parallel divided flow path is formed through first and second transistors for dividing the emitter current of the first transistor and the base input of the second transistor serves as an ON-OFF control input.

It is a further object of this invention to provide an ON-OFF control circuit for a motor with two field windings in which two pairs of transistors are employed, each being of Darlington connection and each being connected to a series coil of the motor, and the base inputs of the transistors which are not directly connected to the series coils serving as ON-OFF control inputs.

The other objects, features and advantages of the present invention will be apparent from the following description taken in conjunction with the accompanying drawing.

DESCRIPTION OF THE PREFERRED EMBODIMENT

Figure 1:
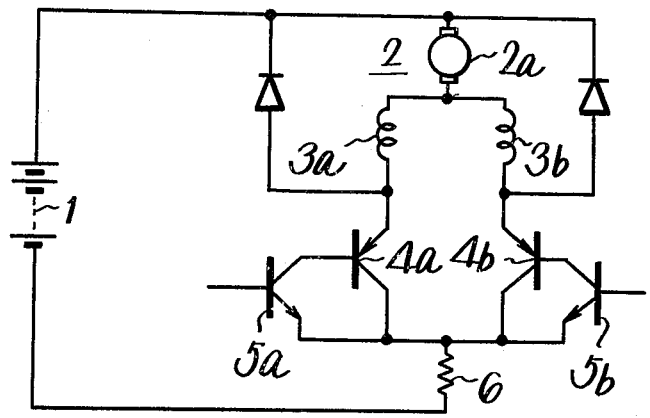
FIGS. 1 and 2 are circuit diagrams respectively showing examples of the conventional ON-OFF control circuit.

In advance of the description of the present invention, one example of a prior art circuit will be hereinbelow described with reference in FIG. 1. In the figure, reference numeral 1 designates a DC power source and 2 a series motor which has an armature 2a and field coils 3a and 3b. Two pairs of transistors 4a, 5a and 4b, 5b, each being connected in a Darlington manner, are provided between the field coils 3a and 3b and a resistor 6.

With such an arrangement, when a current flows through the base electrode of the transistor 5a, a circuit is closed such as in a loop of the power source 1 → the armature 2a → the field coil 3a → the transistors 4a and 5a → the resistor 6 → the power source 1 to rotate the armature 2a in one direction. On the other hand, when a current flows through the base electrode of the transistor 5b, another circuit is similarly closed such as in a loop of the power source 1 → the armature 2a → the field coil 3b → the transistors 4b and 5b → the resistor 6 → the power source 1 to rotate the armature 2a in the other direction or the reverse direction.

In general, a power loss P of a transistor is expressed by the following equation:

$$P = V_{CE}I_C + V_{BE}I_B$$

where $V_{CE}$ and $V_{BE}$ represent respectively a voltage between the collector and emitter of the transistor and a voltage between the base and emitter thereof, while $I_C$ and $I_B$ respectively a current flowing through the collector of the transistor and a current flowing through the base thereof.

In the example of FIG. 1, the transistor pairs 4a, 5a and 4b, 5b are respectively connected in the Darlington manner. Accordingly, if for example, a large current controlling silicon transistor is selected to as the transistor 5a, when the collector current of the transistor 5a is 5 amperes ($I_{C5a} = 5$ amp.) and the base current thereof is 0.5 amperes ($I_{B5a} = 0.5$ amp.), the voltage $V_{CE5a}$ between the collector and emitter of the transistor 5a will satisfy its saturation condition which is referred to as $V_{CE5a\ sat}$. At this time, the $V_{CE5a\ sat}$ is 0.8 volts. Similarly, the saturation condition $V_{BE5a\ sat}$ is 1.6 volts. As a result, the power loss $P_{5a}$ of the transistor 5a is as follows:

$$P_{5a} = 0.8 \times 5 + 1.6 \times 0.5 = 4.8 \text{ watts}$$

Next, if, for example, a large current controlling germanium transistor is selected as the transistor 4a, when the collector current of the transistor 4a is 50 amperes ($I_{C4a} = 50$ amp.) and the base current thereof is 5 amperes ($I_{B4a} = 5$ amp.), the saturation condition $V_{CE4a\ sat}$ is satisfied. In this case, since the transistor 4a is of the Darlington connection, the condition $V_{CE4a\ sat}$ is given as follows:

$$V_{CE4a\ sat} = V_{BE4a\ sat} + V_{CE5a\ sat}$$

Since $V_{BE4a\ sat} = 2.0$ volts, the value of $V_{CE4a\ sat}$ is as follows:

$$V_{CE4a\ sat} = 2.0 + 0.8$$
$$= 2.8 \text{ (volts)}$$

Accordingly, the power loss $P_{4a}$ of the transistor 4a is given as follows:

$$P_{4a} = 2.8 \times 50 + 2 \times 5$$
$$= 150 \text{ (watts)}$$

As apparent from the foregoing, in the case of the prior art example shown in FIG. 1, the power loss of the transistor 4a is quite large, so that the heating amount becomes large and hence it will be expensive to radiate away the heat.

Figure 2:
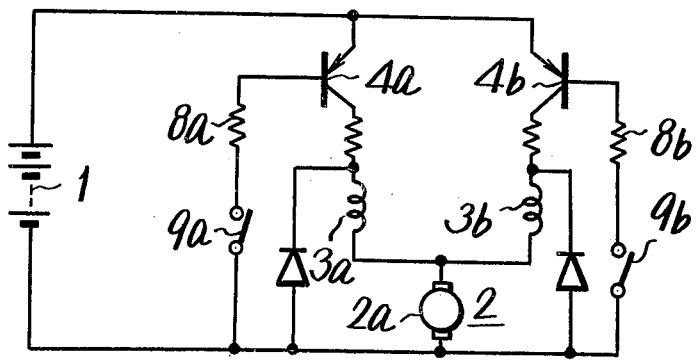

FIG. 2 shows another embodiment of the prior art which intends to avoid the above described defect of the example shown in FIG. 1. In FIG. 2, the same reference numerals as those in FIG. 1 indicate the same elements. In this example, the transistors 4a and 4b are only used instead of the transistor pairs 4a, 5a and 4b, 5b, each pair of which are of Darlington connection as shown in FIG. 1. A series circuit of a resistor 8a and a switch 9a is inserted between the base electrode of the transistor 4a and the power source 1 while another series circuit of a resistor 8b and a switch 9b is inserted between the base electrode of the transistor 4b and the power source 1. With such an arrangement, the resistance values of the resistors 8a and 8b are selected so as to satisfy the saturation conditions of the transistors 4a and 4b for eliminating the defect of the example in FIG. 1. In this case, however, the base currents of the transistors 4a and 4b do not flow through the motor 2 but flow through the resistors 8a and 8b. As a result, there is another defect in that the currents flowing through the resistors 8a and 8b become the complete loss.

Figure 3:
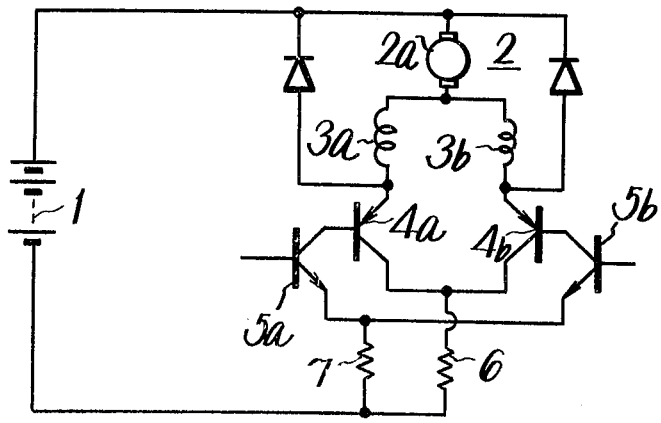
FIG. 3 is a circuit diagram showing one example of an ON-OFF control circuit according to this invention.

With reference to FIG. 3 a description will hereinafter be given on an ON-OFF control circuit for a series motor to which the present invention is applied, by way of example. In FIG. 3, the same reference numerals as those in FIGS. 1 and 2 designate the same elements.

In the present invention, the collector electrodes of the transistors 4a and 4b are connected together through the resistor 6 to the power source 1 while the emitter electrodes of the transistors 5a and 5b are connected together through a resistor 7 to the power source 1. Otherwise the circuit arrangement is substantially the same as that of the example of FIG. 1.

In the present invention shown in FIG. 3, the motor 2 is controlled by the base currents of the transistors 5a and 5b. A consideration will now be given to the condition in which a current flows through the base electrode of the transistor 5a while no current flows through the base electrode of the transistor 5b. In this case, the transistors 5a and 4a become conductive while the transistors 5b and 4b are nonconductive. A current passing through the motor 2 flows from the positive electrode of the power source 1 through the armature 2a, the field coil 3a to the emitter electrode of the transistor 4a. The emitter current of the transistor 4a flows separately to the base and collector electrodes and its base current flows through the transistor 5a and the resistor 7 to the negative electrode of the power source 1. On the other hand, the collector current of the transistor 4a flows through the resistor 6 to the negative electrode of the power source 1. In this case, the divided flow ratio between the base and collector currents of the transistors 4a is substantially determined by the inverse ratio of the resistance values of the resistors 6 and 7. In this case, the above divided flow ratio is selected so as to satisfy the current-amplification factor of the transistor 4a and its collector-emitter voltage saturation condition.

In the example of FIG. 3, similarly as the example of FIG. 1, if, for example, a large current controlling germanium transistor is employed as the transistor 4a, the condition $V_{CE4a\ sat}$ is satisfied at $I_{C4a} = 50$ amp. and $I_{B4a} = 5$ amp. In this case, since $V_{CE4a\ sat} = 0.2$ volts and $V_{BE4a\ sat} = 20$ volts, the power loss $P_{4a}$ of the transistor 4a is as follows:

$$P_{4a} = 20 \text{ watts}$$

Meantime, similarly as the example of FIG. 1, if, for example, a large current controlling silicon transistor is employed as the transistor 5a, the condition $V_{CE5a\ sat}$ is satisfied at $I_{C5a} = 5$ amp. and $I_{B5a} = 0.5$ amp. In this case, since $V_{CE5a\ sat} = 0.8$ volts and $V_{BE5a\ sat} = 1.6$ volts, the power loss $P_{5a}$ of the transistor 5a becomes as follows:

$$P_{5a} = 4.8 \text{ watts}$$

As apparent from the foregoing, it will be understood that the power loss of the last-stage transistor 4a according to this invention is quite small as compared with that of the prior art example of FIG. 1 and hence the expence required for radiating away the heat is very small.

Further, in the example of this invention shown in FIG. 3, the base current of the transistor 4a flows through the resistor 7 to cause power consumption. However, this loss resides in a resistor necessary for circuit construction and hence is the loss necessary for circuit construction. This is the main difference between the example of this invention and the prior art one shown in FIG. 2.

As described above, the present invention is free from the defects of FIGS. 1 and 2.

Further, it should be noticed that as a modified circuit of the example shown in FIG. 3, the transistors 4a, 4b, 5a and 5b can be replaced by other type of transistors and the resistors 6 and 7 may be inserted in other places or separated from each other.

In addition, as a furthermodification, it may be considered that the transistors 5a and 5b are connected with another transistors respectively in a Darlington manner to increase the current-amplification factor. In this case, the power losses of the transistors 5a and 5b are increased, but still small as compared with those of the example of FIG. 1 in which the transistors 4a and 4b are connected respectively in the Darlington manner with the result that its economical feature will not be spoiled.

Further, the description has been made on the case where this invention is applied to the ON-OFF control of the motor with two series field windings. However, it will be obvious that this invention is also applicable to the ON-OFF control of a motor with two shunt field windings, a motor with two compound field windings or the other type of DC motor and further to the ON-OFF control of a load which requires large electric power in general.

It is intended, therefore, that all matter contained in the foregoing description and in the drawings shall be interpreted as illustrative not only as limitative of the invention.

We claim as our invention:

1. An ON-OFF control circuit for a load requiring large DC electrical power comprising: a DC electrical power source, first and second transistors, first and second resistors, a first current path composed of said first transistor and said first resistor, and a second current path composed of said second transistor and said second resistor, the first current path being connected at its one end to one terminal of the DC electrical power source through said load and at its other terminal to the other terminal of the DC electrical power source, the second current path being connected at its one end to the base electrode of the first transistor and its other end to the other terminal of the DC electrical power source and the base electrode of said second transistor being supplied with an ON-OFF control input signal and said first and second current paths passing through said load.

2. An ON-OFF control circuit for a load requiring large DC electrical power according to claim 1 in which the ratio of currents flowing through the first and second current paths is determined by the resistance values of the first and second resistors and the resistance values of the first and second resistors are selected so as to satisfy the current-amplification factor of the first transistor and the saturation condition of voltage across the emitter-collector of the first transistor.

3. An ON-OFF control circuit for a load requiring large DC electrical power according to claim 1 in which the second transistor is a Darlington connected transistor.

4. An ON-OFF control circuit for a motor with two field windings and requiring large DC electrical power comprising a DC electrical power source, first to fourth transistors, first and second resistors, a first current path composed of the first transistor and first resistor, a second current path composed of the second transistor and second resistor, a third current path composed of the third transistor and first resistor, a fourth current path composed of the fourth transistor and second resistor, the first current path being connected at its one end to one terminal of the DC electrical power source through one of the two field windings and at its other end ot the other terminal of the DC power source, the second current path being connected at its one end to the base electrode of the first transistor and its other end to the other terminal of the DC power source, the third current path being connected at its one end to the one terminal of the DC power source through the other of the two field windings and at its other end to the other terminal of the DC power source, the fourth current path being connected at its one end to the base electrode of the third transistor and at its other end to the other terminal of the DC power source, and the base electrodes of the second and fourth transistors being supplied with ON-OFF control input signals.

5. An On-Off control circuit for a motor with two field windings and requiring large DC electrical power according to claim 4 in which the first and second resistors have one ends connected in common.

6. An On-Off control circuit for a motor with two field windings and requiring large DC electrical power according to claim 4 in which the second and fourth transistors are Darlington connected transistors.

* * * * *